United States Patent
Oota

(10) Patent No.: US 9,417,623 B2
(45) Date of Patent: Aug. 16, 2016

(54) NUMERICAL CONTROL DEVICE WITH SERVO-OUTPUT DELAY UNIT

(71) Applicant: FANUC Corporation, Minamitsuru-gun, Yamanashi (JP)

(72) Inventor: Yuu Oota, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 81 days.

(21) Appl. No.: 14/568,512

(22) Filed: Dec. 12, 2014

(65) Prior Publication Data

US 2015/0168941 A1 Jun. 18, 2015

(30) Foreign Application Priority Data

Dec. 16, 2013 (JP) .................................. 2013-259479

(51) Int. Cl.
G05B 19/404 (2006.01)
G05B 19/406 (2006.01)

(52) U.S. Cl.
CPC ............ *G05B 19/404* (2013.01); *G05B 19/406* (2013.01)

(58) Field of Classification Search
CPC .... G05B 19/40; G05B 19/4147; H02P 6/085; H02P 6/10; H02P 6/182
USPC .................. 318/569, 484, 603, 560
See application file for complete search history.

(56) References Cited

U.S. PATENT DOCUMENTS

| 4,568,866 A * | 2/1986 | Floro ................. G05B 19/4147 318/561 |
| 6,255,789 B1 * | 7/2001 | Ochi ........................ H02P 6/10 318/400.17 |
| 2009/0243526 A1 * | 10/2009 | Ito .......................... H02P 6/182 318/400.34 |
| 2013/0285589 A1 | 10/2013 | Sugie et al. |

FOREIGN PATENT DOCUMENTS

| JP | H03-252706 A | 11/1991 |
| JP | 2002268751 A | 9/2002 |
| JP | 2006-227719 A | 8/2006 |
| WO | WO-2012/114435 A1 | 8/2012 |

OTHER PUBLICATIONS

Decision to Grant a Patent issued Jan. 5, 2016 in Japanese Patent Application No. 2013-259479 (3 pages) with an English Translation (3 pages).

* cited by examiner

*Primary Examiner* — Paul Ip
(74) *Attorney, Agent, or Firm* — Drinker Biddle & Reath LLP

(57) ABSTRACT

A manual pulse generator stores pulse data for past several cycles, along with an up-to-date pulse, into its buffer area. A numerical control device receives the pulse data transmitted from the manual pulse generator through a communication unit. An accumulated pulse amount calculation unit determines the amount of pulses to be accumulated in the buffer area according to the frequency of occurrence of communication errors of the received pulse data. A servo-output delay unit commands a control unit to start outputting to a servo processing unit after the received pulses are accumulated to the amount determined by the accumulated pulse amount calculation unit.

3 Claims, 8 Drawing Sheets

NUMERICAL CONTROL DEVICE WITH SERVO-OUTPUT DELAY UNIT

RELATED APPLICATION DATA

This application claims priority under 35 U.S.C. §119 and/or §365 to Japanese Application No. 2013-259479 filed Dec. 16, 2013, the entire contents is incorporated herein by reference.

BACKGROUND OF THE INVENTION

1. Field of the Invention

The present invention relates to a numerical control device for controlling a machine tool, and more particularly, to a numerical control device with a servo-output delay unit.

2. Description of the Related Art

In manually feeding axes in, for example, initial setup of a machine tool controlled by a numerical control device, an operator rotates a rotary dial of a manual pulse generator to generate pulses relating to the amount of movement by the manual feed.

Pulse data generated by the manual pulse generator is received by the numerical control device through network communication. The pulse data received by the numerical control device is written to a buffer of the control device. In the numerical control device, the pulse data written to the buffer is read and output to a servo processing unit, thereby driving a servomotor for activating a mechanism section of the machine tool or an industrial machine.

If a communication error occurs in the control device, the pulse data generated by the manual pulse generator is not received by the control device through the network communication. Therefore, the pulse data cannot be written to the buffer in the numerical control device, and a pulse for the cycle concerned is not output to a servo control unit for controlling the servomotor. Consequently, the machine suddenly stops, thereby causing a mechanical shock (see FIG. 8). As shown in FIG. 8, the occurrence of the communication error produces a blank cycle in the pulse data transmitted from the manual pulse generator. Since the pulse data received by the numerical control device becomes discontinuous, drive control of the servomotor for driving the machine cannot be normally performed and a mechanical shock occurs.

For example, claim 2 of Japanese Patent Application Laid-Open No. 2002-268751 discloses a servo control device configured to perform a movement of an axis toward a position intermediate between target positions stored before and after the occurrence of a communication error, if any, during the movement. The servo control device disclosed in this patent document cannot achieve the axis movement precisely corresponding to pulse data output from a manual pulse generator. Thus, according to this conventional method, a previously registered recovery operation is inserted in case of a communication error, so that commanded operations may fail to be achieved.

SUMMARY OF THE INVENTION

Accordingly, in order to solve the above problems of the prior art, the object of the present invention is to provide a numerical control device with servo-output delay unit.

A numerical control device with servo-output delay unit according to the present invention is configured to receive pulse data from a manual pulse generator by a communication unit and drive a motor. The numerical control device comprises a memory comprising a buffer area for storing the pulse data for each communication period, a communication control unit configured to write the pulse data received by the communication unit to the buffer area, a control unit configured to read the pulse data from the buffer area and output the pulse data to a servo processing unit for driving the motor, an accumulated pulse amount calculation unit configured to determine the amount of pulses to be accumulated in the buffer area according to the frequency of occurrence of communication errors of the pulse data received by the communication unit, and a servo-output delay unit configured to command the control unit to start outputting to the servo processing unit after the received pulses are accumulated to the amount determined by the accumulated pulse amount calculation unit.

The numerical control device with servo-output delay unit may comprise an error frequency calculation unit configured to obtain the frequency of occurrence of communication errors by counting the number of occurrences of communication errors occurred within a preset time, until the drive of the motor by the manual pulse generator is started after the start of communication between the numerical control device and the manual pulse generator after the numerical control device is turned on. The accumulated pulse amount calculation unit may be configured to calculate the amount of pulses to be accumulated in the buffer area from the value of the frequency of occurrence of communication errors determined by the error frequency calculation unit.

The numerical control device with servo-output delay unit may comprise a monitoring unit, configured to monitor an excess or deficiency of pulses accumulated in the buffer area by monitoring discontinuance of pulses output to the servo processing unit and a delay time from completion of the reception of the pulse data until completion of the output to the servo processing unit, and an adjusting unit configured to recalculate the frequency of occurrence of communication errors and adjust the amount of pulses to be accumulated in the buffer area if the excess or deficiency of pulses accumulated in the buffer area is detected.

According to the present invention configured as described above, there can be provided a numerical control device with servo-output delay unit.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

First Embodiment

Figure 1:
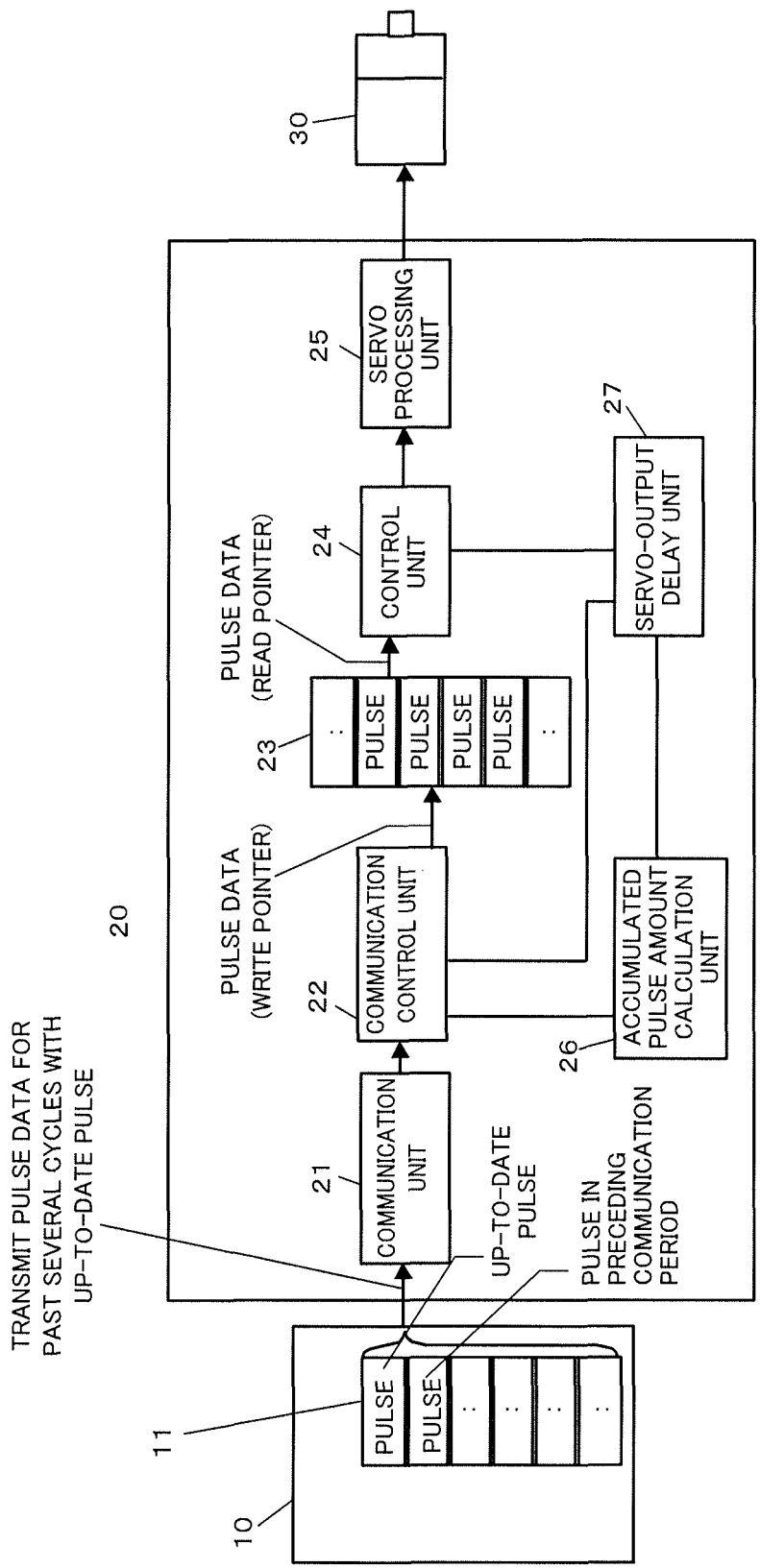
FIG. 1 is a schematic block diagram of one embodiment of the present invention.

FIG. 1 is a schematic block diagram of one embodiment of the present invention. In manually feeding axes in, for example, initial setup of a machine tool controlled by a numerical control device 20, an operator rotates a rotary dial of a manual pulse generator 10 to generate pulses relating to the amount of movement by the manual feed. The manual pulse generator 10 comprises a buffer 11, which stores the pulses generated by the manual pulse generator, including an up-to-date pulse and pulses generated in the past several cycles, for each communication period.

The numerical control device 20 for controlling the machine tool (not shown) receives pulse data transmitted from the manual pulse generator 10 through a communication unit 21. The numerical control device 20 comprises a memory 23 having a buffer area configured to store the received pulse data for each communication period. A communication control unit 22 writes the pulse data received by the communication unit 21 for each cycle to a memory area for the memory 23. A control unit 24 reads the pulse data from the buffer area of the memory 23 and outputs it to a servo processing unit 25 that drives a servomotor 30. The servo processing unit 25 uses the input pulse data to perform servo control processing and drivingly controls the servomotor 30, which is attached to a mechanism section of the machine tool.

An accumulated pulse amount calculation unit 26 determines the amount of pulses to be accumulated in the buffer area according to the frequency of occurrence of errors in the communication of the pulse data received by the communication unit 21. A servo-output delay unit 27 commands the control unit 24 to start outputting to the servo processing unit 25 after the received pulses are accumulated to the amount determined by the accumulated pulse amount calculation unit 26.

Figure 2:
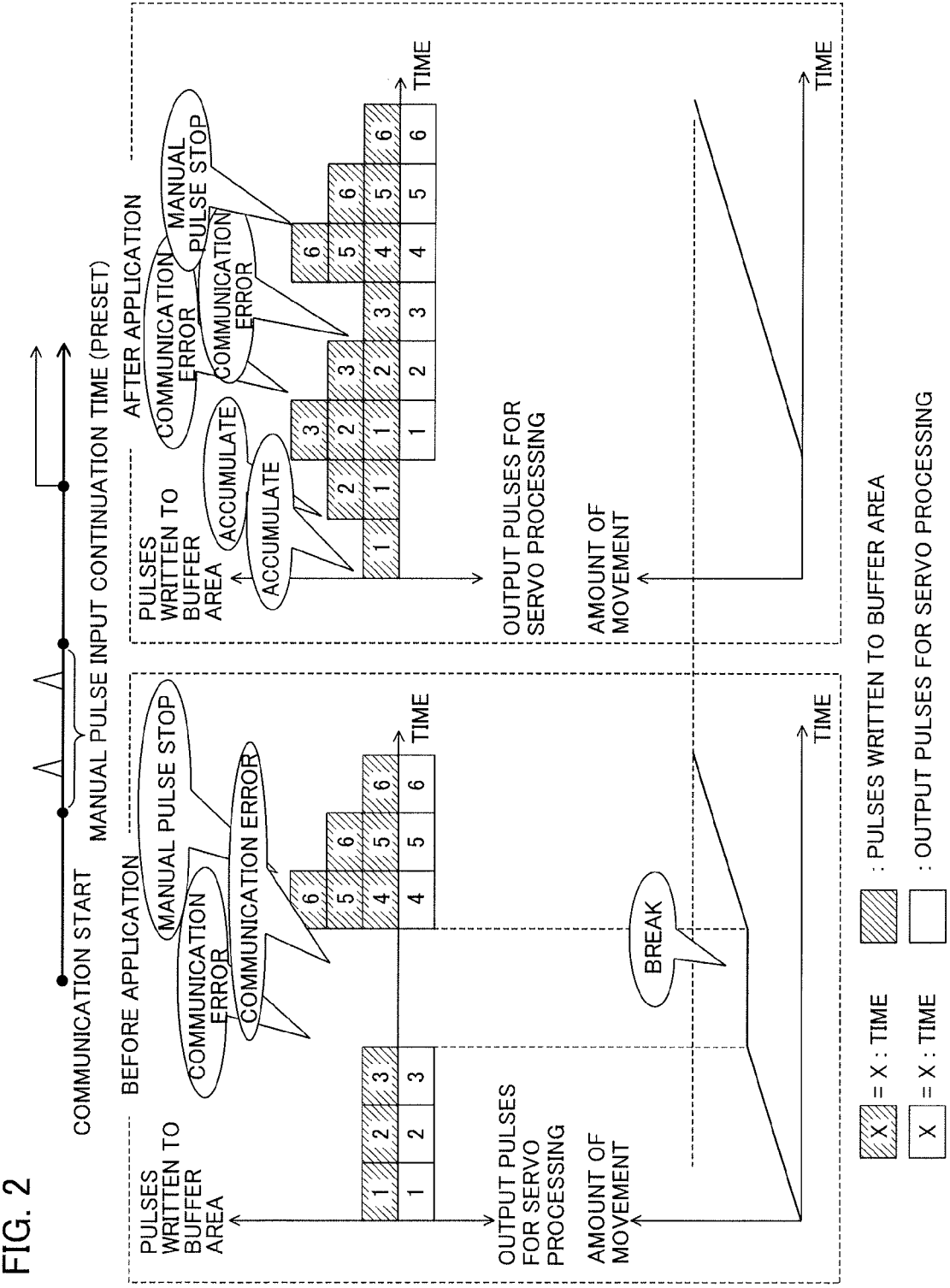
FIG. 2 is a diagram illustrating the one embodiment.

The following is a description of the occurrence frequency of communication errors of the pulse data. FIG. 2 is a diagram illustrating the first embodiment relating to claim 1. The left half of FIG. 2 illustrates pulses written in the buffer area of the memory 23 and output pulses read from the buffer area of the memory 23 and output to the servo processing unit 25 without the application of the method of the first embodiment. The right haft of FIG. 2 illustrates pulses written in the buffer area of the memory 23 and output pulses read from the buffer area of the memory 23 and output to the servo processing unit 25 based on the application of the first embodiment.

The incidence of communication errors occurs and a cycle counter are counted, until the handle of the manual pulse generator 10 starts to be rotated after the numerical control device 20 is turned on. When a manual pulse input continuation time preset by the cycle counter is reached, the number of occurrences of communication errors is counted and regarded as the occurrence frequency of communication errors.

Based on this occurrence frequency of communication errors, the amount of pulses to be accumulated is determined at the start of rotation of the handle of the manual pulse generator 10. If two communication errors are occurred within the manual pulse input continuation time, for example, the occurrence frequency of communication errors is "2", so that pulses for two cycles are accumulated (see the right half of FIG. 2). If the reading of the pulse data written in the buffer area and the output to the servo processing unit 25 are delayed by the accumulation for the two cycles, the pulse data is not discontinued as described below.

Second Embodiment

Figure 3:
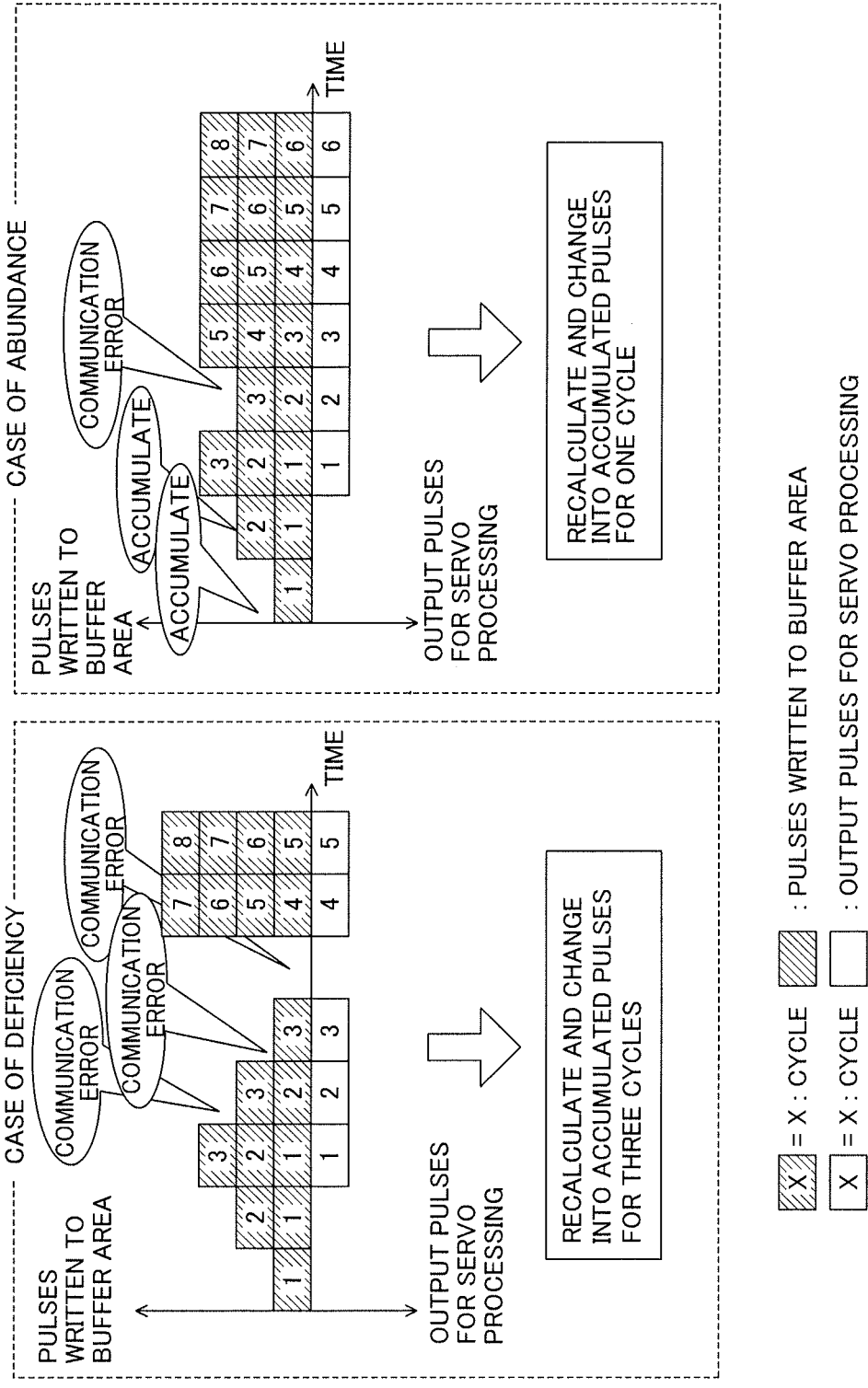
FIG. 3 is a diagram illustrating the one embodiment.

If the occurrence frequency of communication errors is changed by a change of the communication environment after the amount of accumulated pulse data is calculated by the accumulated pulse amount calculation unit 26, the amount of pulses to be accumulated becomes inappropriate. FIG. 3 is a diagram illustrating the second embodiment relating to claim 3. The left half of FIG. 3 shows a case where the amount of pulses to be accumulated is small. In this case, the amount of pulses accumulated in the buffer area is too small as compared with the occurrence frequency of communication errors, so that the pulse output to the servo processing unit 25 is insufficient. The right half of FIG. 3 shows a case where the amount of pulses to be accumulated is large. In this case, the amount of pulses accumulated in the buffer area is too large as compared with the occurrence frequency of communication errors, so that the pulse output to the servo processing unit 25 is delayed. Thus, it takes a long time for the servomotor 30 to stop after completion of pulse input.

Thereupon, if the occurrence frequency of communication errors is so high that the amount of pulses to be accumulated is insufficient, for example, the number of occurrences of communication errors within a preset time is recalculated and the amount of pulses to be accumulated is increased. If the occurrence frequency of communication errors is reduced so that the amount of pulses to be accumulated increases, in contrast, the number of occurrences of communication errors within the preset time is recalculated and the amount of pulses to be accumulated is reduced. In this way, the amount of pulses to be accumulated can always be optimally adjusted to the communication environment.

Processing for servo-output delay will now be described with reference to the flowcharts of FIGS. 4 to 7.

Figure 4:
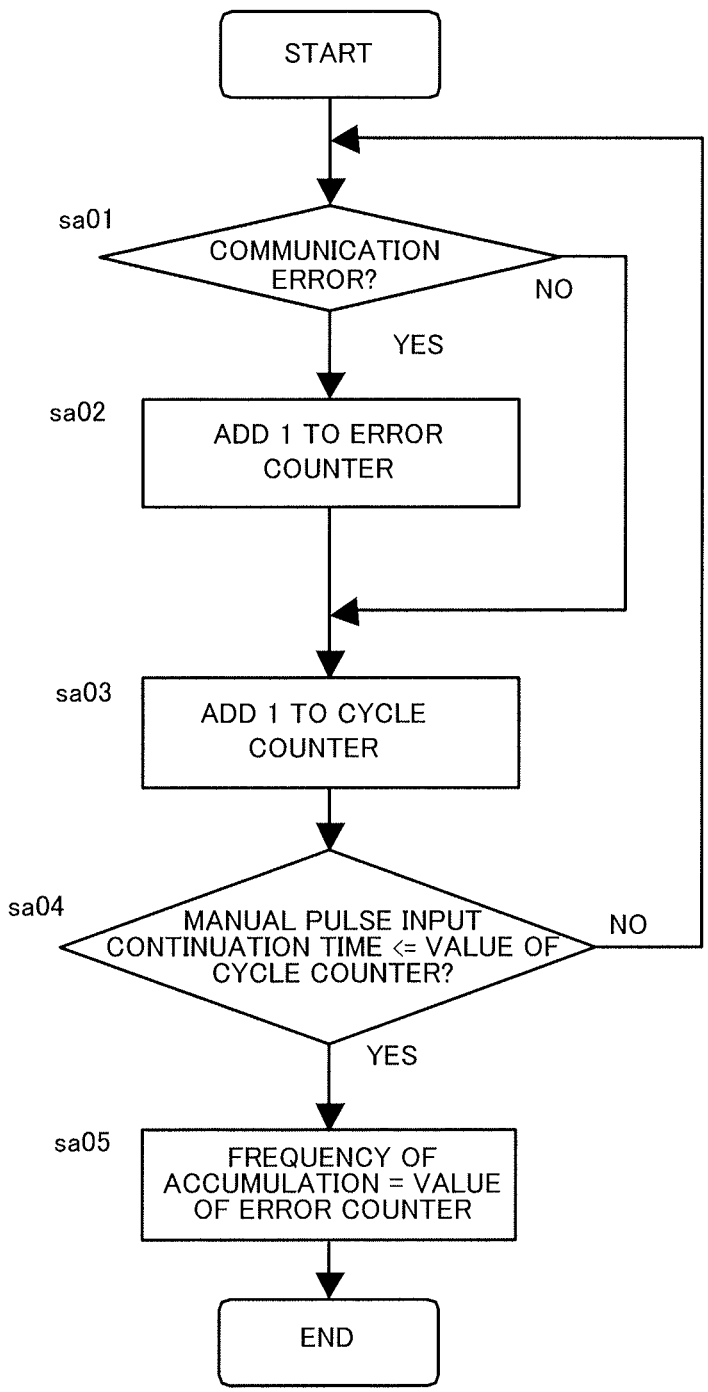
FIG. 4 is a flowchart of processing for counting the frequency of accumulation of pulse data.

FIG. 4 is a flowchart of processing for counting the frequency of accumulation of pulse data. The following is a sequential description of steps of this processing. The processing shown in the flowchart of FIG. 4 is performed by the accumulated pulse amount calculation unit 26.

[Step sa01] It is determined whether or not a communication error occurred. If a communication error occurred (YES), the processing proceeds to Step sa02. If not (NO), the processing proceeds to Step sa03.

[Step sa02] One is added to an error counter.

[Step sa03] One is added to the cycle counter.

[Step sa04] It is determined whether or not the value of the cycle counter for counting in Step sa03 is not less than the manual pulse input continuation time. If the value of the cycle counter is not less than the manual pulse input continuation time (YES), the processing proceeds to Step sa05. If not (NO), the processing returns to Step sa01, whereupon the processing is continued.

[Step sa05] The processing is finished, regarding the value of the error counter for counting in Step sa02 as the frequency of accumulation.

Figure 5:
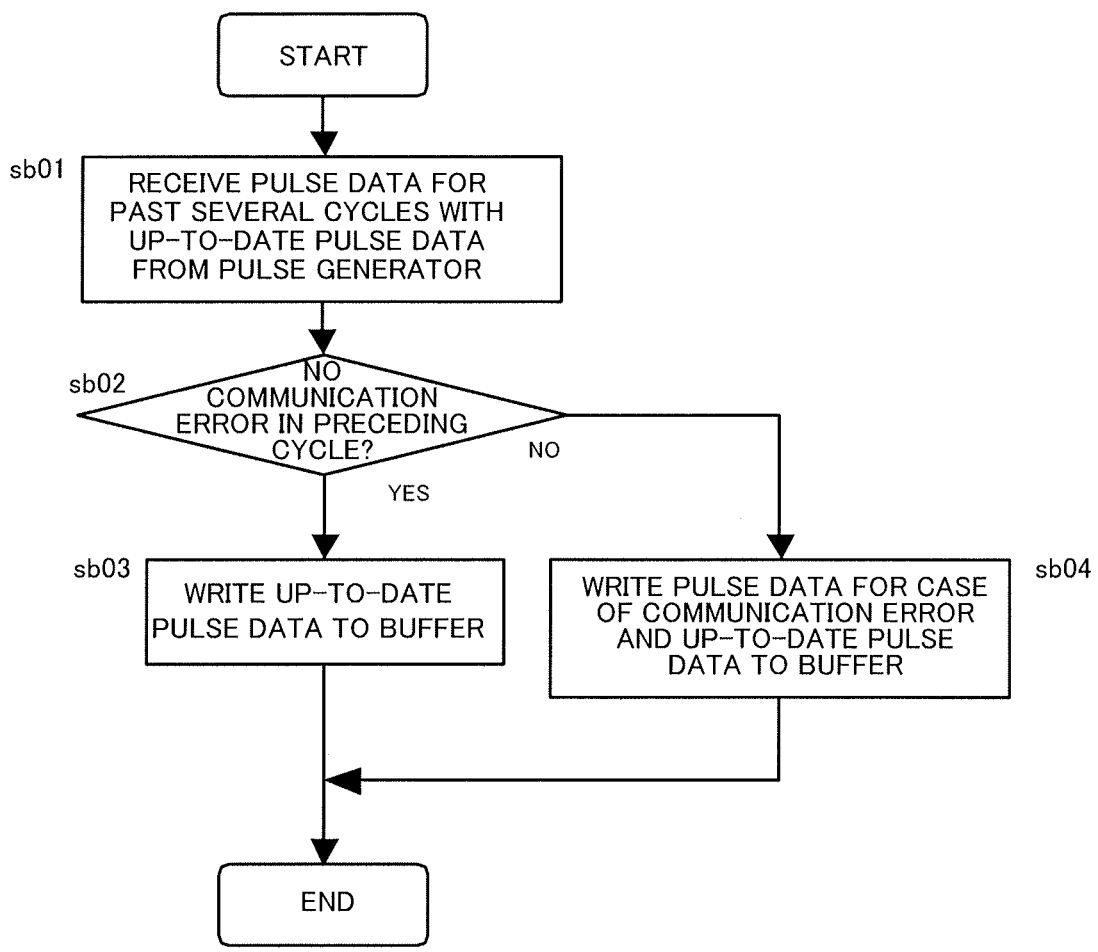
FIG. 5 is a flowchart of processing for writing pulse data to a buffer of a memory of a numerical control device.

FIG. 5 is a flowchart of processing for writing pulse data to the buffer of the memory of the numerical control device. The processing shown in the flowchart of FIG. 5 is performed by the communication unit 21 and the communication control unit 22.

[Step sb01] Pulse data for past several cycles is received together with up-to-date pulse data from the pulse generator. The pulse data for past several cycles is set based on the frequency of accumulation obtained with reference to FIG. 4.

[Step sb02] It is determined whether or not there is no communication error in the preceding cycle. If there is no communication error (YES), the processing proceeds to Step sb03. If there is a communication error (NO), the processing proceeds to Step sb04.

[Step sb03] The up-to-date pulse data is written to the buffer, whereupon the processing ends.

[Step sb04] Pulse data for the case of the occurrence of a communication error and the up-to-date pulse data are written to the buffer, whereupon the processing ends.

Figure 6:
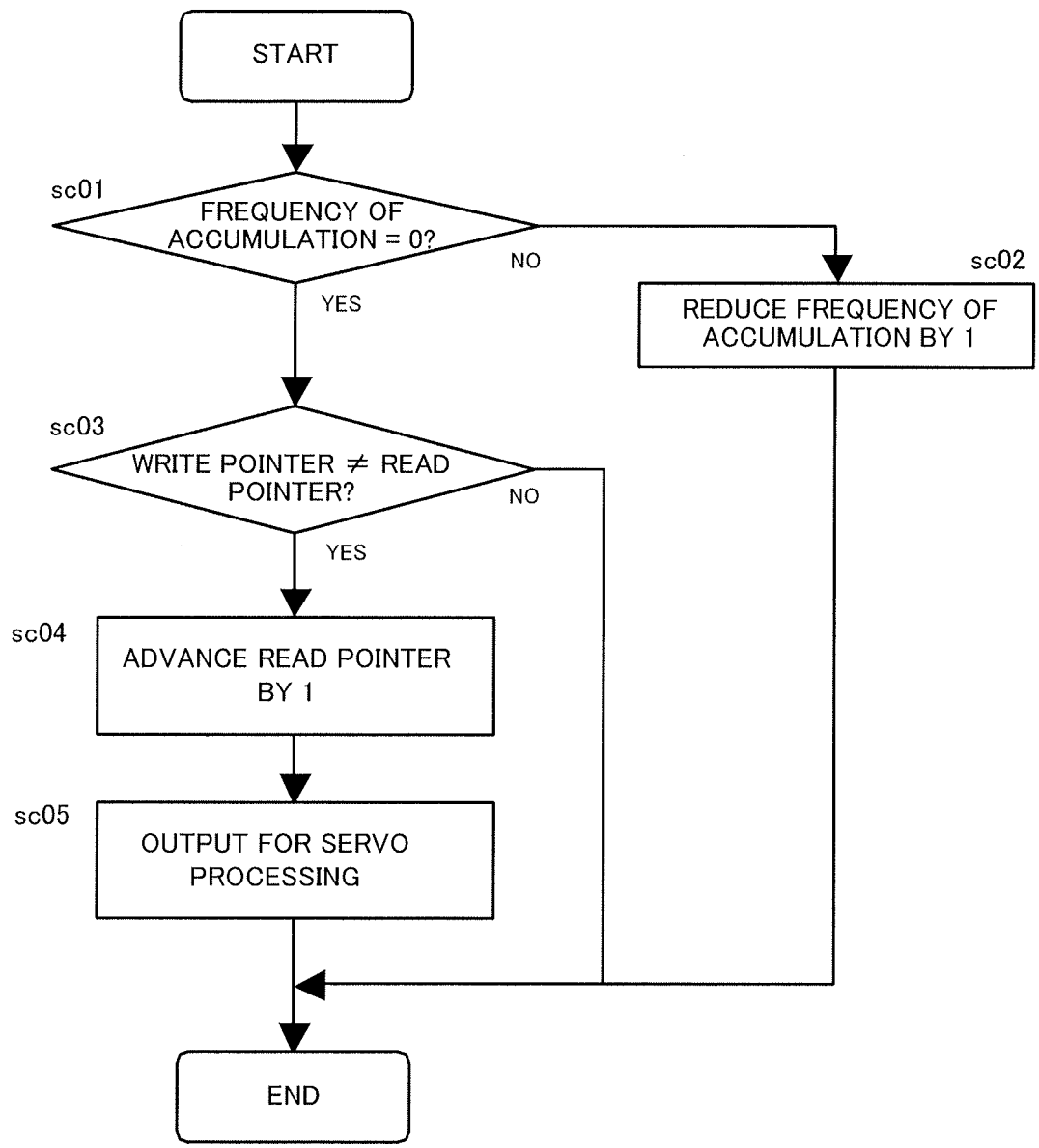
FIG. 6 is a flowchart of processing for reading pulse data.

FIG. 6 is a flowchart of processing for reading pulse data. The processing shown in FIG. 6 is performed by the servo-output delay unit 27 and the control unit 24. The processing of FIG. 6 corresponds to the servo-output delay unit.

[Step sc01] It is determined whether or not the frequency of accumulation is "0". If the frequency of accumulation is "0", the processing proceeds to Step sc03. If not (NO), the processing proceeds to Step sc02.

[Step sc02] The frequency of accumulation is reduced by one, whereupon the processing ends.

[Step sc03] It is determined whether or not the positions of a write pointer and a read pointer are different from each other. If the positions are different (YES), the processing proceeds to Step SC04. If not (NO), the processing ends.

[Step sc04] The position of the read pointer is advanced by one.

[Step sc05] A pulse is output to the servo processing unit, whereupon the processing ends.

Figure 7:
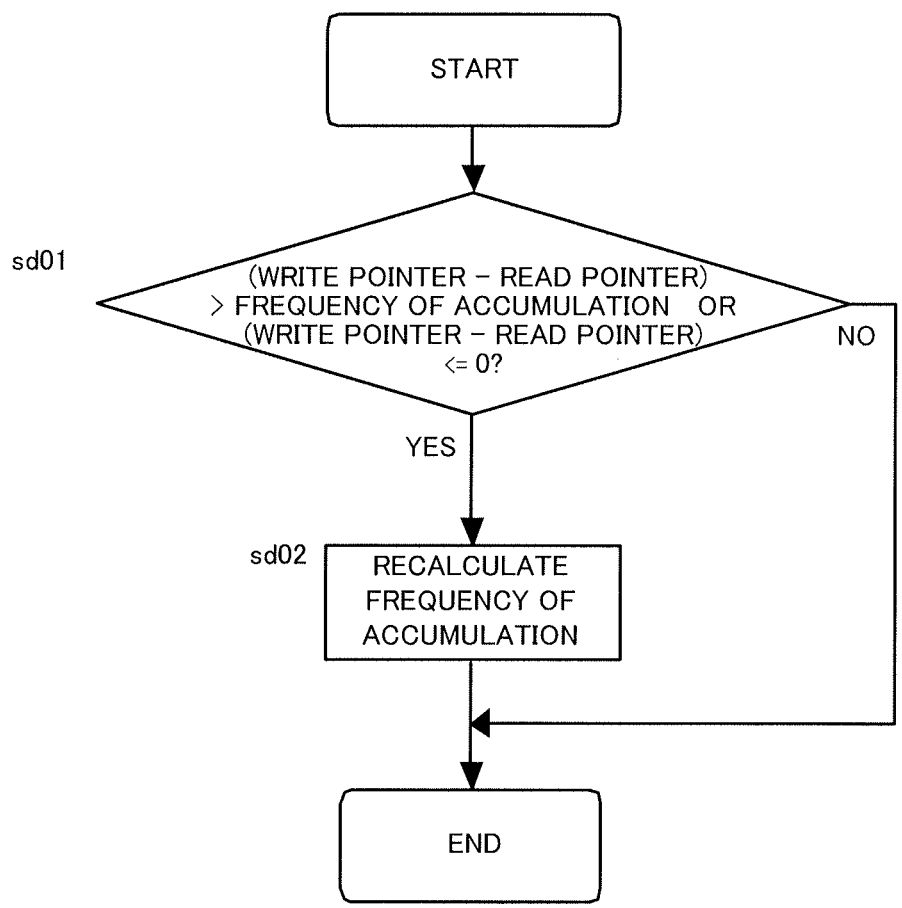
FIG. 7 is a flowchart of processing for recalculating the frequency of accumulation of pulse data.
Figure 8:
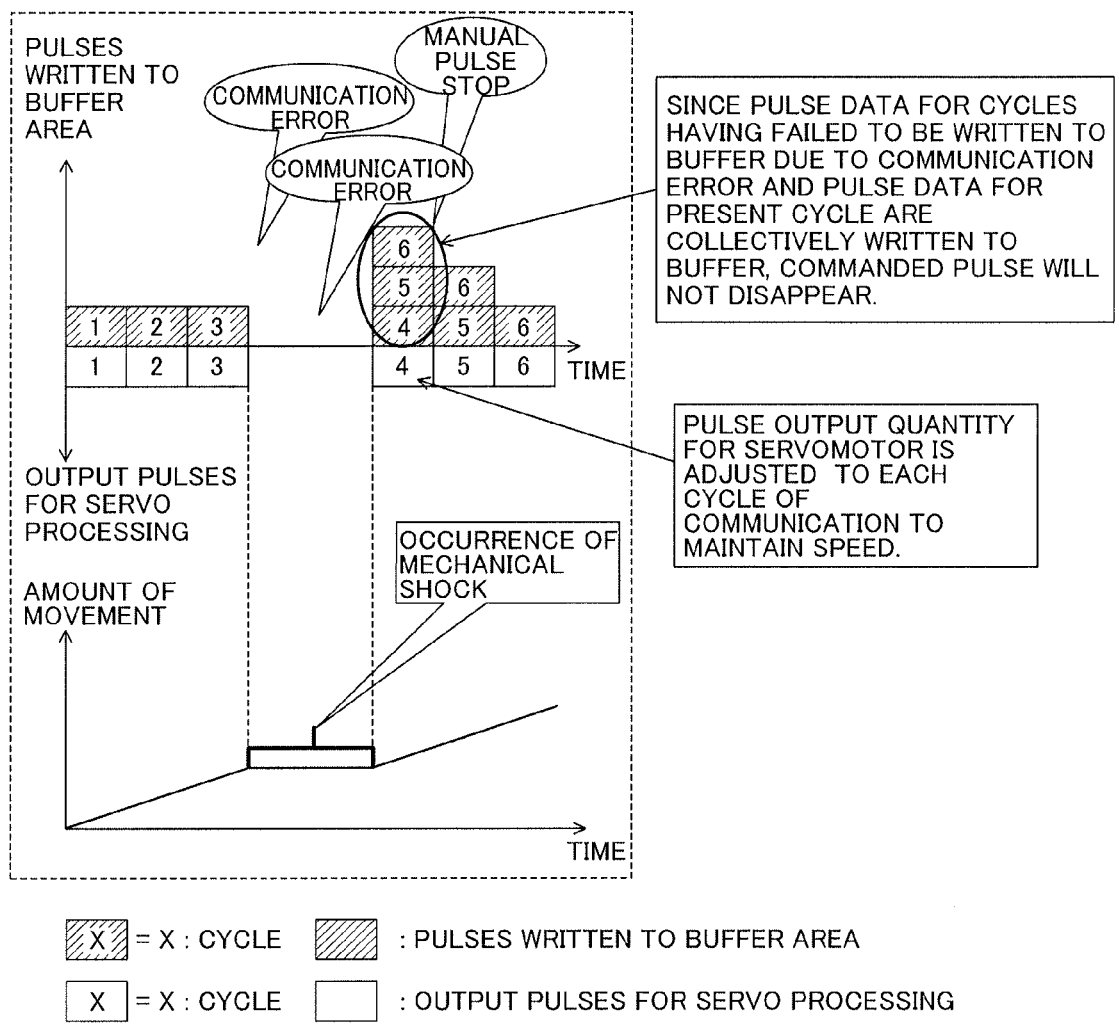
FIG. 8 is a diagram illustrating a conventional technique.

FIG. 7 is a flowchart of processing for recalculating the frequency of accumulation of pulse data. The processing shown in FIG. 7 is performed by the accumulated pulse amount calculation unit 26.

[Step sd01] It is determined whether the difference between the positions of the write and read pointers is greater than the frequency of accumulation or is "0" or less. If the difference is greater than the frequency of accumulation or is "0" or less (YES), the processing proceeds to Step sd02. If not (NO), the processing ends.

[Step sd02] The frequency of accumulation is recalculated, whereupon the processing ends.

The invention claimed is:

1. A numerical control device with a servo-output delay unit configured to receive pulse data from a manual pulse generator by a communication unit and drive a motor, the numerical control device comprising:

a memory comprising a buffer area for storing the pulse data for each communication period;

a communication control unit configured to write the pulse data received by the communication unit to the buffer area;

a control unit configured to read the pulse data from the buffer area and output the pulse data to a servo processing unit for driving the motor;

an accumulated pulse amount calculation unit configured to determine the amount of pulses to be accumulated in the buffer area according to the frequency of occurrence of communication errors of the pulse data received by the communication unit; and a servo-output delay unit configured to command the control unit to start outputting to the servo processing unit after the received pulses are accumulated to the amount determined by the accumulated pulse amount calculation unit.

2. The numerical control device with a servo-output delay unit according to claim 1, comprising an error frequency calculation unit configured to obtain the frequency of occurrence of communication errors by counting the number of occurrences of communication errors occurred within a preset time, until the drive of the motor by the manual pulse generator is started after the start of communication between the numerical control device and the manual pulse generator after the numerical control device is turned on, and, the accumulated pulse amount calculation unit is configured to calculate the amount of pulses to be accumulated in the buffer area from the value of the frequency of occurrence of communication errors determined by the error frequency calculation unit.

3. The numerical control device with a servo-output delay unit according to claim 1, comprising a monitoring unit, configured to monitor an excess or deficiency of pulses accumulated in the buffer area by monitoring discontinue of pulses output to the servo processing unit and a delay time from completion of the reception of the pulse data until completion of the output to the servo processing unit, and an adjusting unit configured to recalculate the frequency of occurrence of communication errors and adjust the amount of pulses to be accumulated in the buffer area if the excess or deficiency of pulses accumulated in the buffer area is detected.

* * * * *